(12) United States Patent
Spychalla

(10) Patent No.: US 7,200,001 B2
(45) Date of Patent: Apr. 3, 2007

(54) DATA STORAGE CARTRIDGE WITH HARD DRIVE AND ALIGNMENT FEATURE

(75) Inventor: Leo W. Spychalla, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/725,259

(22) Filed: Dec. 1, 2003

(65) Prior Publication Data

US 2005/0117288 A1 Jun. 2, 2005

(51) Int. Cl.
  *H05K 5/00* (2006.01)
  *G11B 33/02* (2006.01)
  *G11B 33/12* (2006.01)
  *A47B 81/06* (2006.01)
  *A47B 97/00* (2006.01)

(52) U.S. Cl. .................. 361/685; 361/683; 369/75.11; 720/652; 312/9.41; 312/9.1; 312/223.1; 312/223.2

(58) Field of Classification Search ................ 361/685; 360/97.01, 98.01, 137; 248/633, 634, 636, 248/638, 611
See application file for complete search history.

(56) References Cited

U.S. PATENT DOCUMENTS

| | | | |
|---|---|---|---|
| 4,272,795 A | 6/1981 | Davis, Jr. et al. | |
| 5,402,308 A * | 3/1995 | Koyanagi et al. | 361/685 |
| 5,788,211 A * | 8/1998 | Astier | 248/674 |
| 5,886,850 A * | 3/1999 | Kaczeus et al. | 360/97.01 |
| 6,061,231 A * | 5/2000 | Crockett | 361/681 |
| 6,084,768 A * | 7/2000 | Bolognia | 361/685 |
| 6,317,317 B1 * | 11/2001 | Lu et al. | 361/685 |
| 6,324,054 B1 * | 11/2001 | Chee et al. | 361/685 |
| 6,331,079 B1 * | 12/2001 | Grois et al. | 385/53 |
| 6,508,428 B2 | 1/2003 | Hoge et al. | |
| 6,540,528 B2 | 4/2003 | Brodsky et al. | |
| 6,545,865 B2 | 4/2003 | Albrecht et al. | |
| 6,690,539 B2 | 2/2004 | Gallo et al. | |
| 6,722,895 B1 | 4/2004 | Brodsky et al. | |
| 6,762,932 B2 * | 7/2004 | Regimbal et al. | 361/683 |
| 6,826,004 B2 | 11/2004 | Albrecht et al. | |
| 6,837,718 B2 | 1/2005 | Brodsky et al. | |
| 6,854,982 B2 | 2/2005 | Brodsky et al. | |
| 6,867,942 B2 | 3/2005 | Albrecht et al. | |

* cited by examiner

*Primary Examiner*—Lisa Lea-Edmonds
*Assistant Examiner*—Zachary Pape
(74) *Attorney, Agent, or Firm*—Eric D. Levinson

(57) ABSTRACT

A data storage cartridge includes a housing and a hard drive. The housing defines an access window and at least one alignment feature. The hard drive is maintained within the housing. The hard drive has at least one electrical connection point, and the at least one alignment feature is configured to interact with the hard drive to align the at least one electrical connection point relative to the access window.

6 Claims, 8 Drawing Sheets

DATA STORAGE CARTRIDGE WITH HARD DRIVE AND ALIGNMENT FEATURE

THE FIELD OF THE INVENTION

The present invention generally relates to a data storage cartridge. More particularly, the present invention relates to a data storage cartridge for housing a hard drive and having an alignment feature to position the hard drive within the housing.

BACKGROUND OF THE INVENTION

Data storage tape cartridges have been used for decades in the computer, audio, and video fields as a means for storing electronic files. The data storage tape cartridges continue to be a popular form of recording large volumes of information for subsequent retrieval and use, particularly in a library setting. Automated, data storage tape cartridge libraries provide access to vast amounts of electronic data by storing and managing data storage tape cartridges.

In a conventional, automated, data storage tape cartridge library system, an automation unit, such as a robotic arm or other mechanism, typically services a plurality of data storage tape cartridge locations. The automation unit selectively retrieves a data storage tape cartridge from one of the storage locations and loads the retrieved data storage tape cartridge into a designated tape drive. The tape drive reads data from or writes new data to the data storage tape cartridge. When the tape drive is finished with the data storage tape cartridge, the automation unit retrieves the data storage tape cartridge from the tape drive and returns it to the assigned storage location. A host computing system communicates with the library controlling unit to typically control the operation of the automated cartridge library. In this way, a large number of data storage tape cartridges are automatically accessible by one or more tape drives.

To manipulate a data storage tape cartridge, the automation unit typically includes an interface, such as a gripper on a robotic arm, that engages the data storage tape cartridge and allows the automation unit to convey and manipulate the orientation of the data storage tape cartridge. Because the data storage tape cartridges must be positioned in a precise manner for the robotic arm to grasp and position them correctly, the data storage tape cartridges and the storage locations are constructed with exact dimensions. Accordingly, the data storage tape cartridges that the library system houses typically have substantially similar, if not identical, form factors in order to be properly received by the interface of the automation unit.

Although conventional, automated libraries provide access to vast amounts of information, the data storage tape cartridges do not allow for true random access of files stored on the data storage tape cartridges. In particular, a conventional data storage tape cartridge consists of a tape, i.e., an elongated flexible medium having a magnetic recording layer, wound on one or more wheels or hubs. Data is recorded and retrieved by inserting the data storage tape cartridge within a tape drive and passing the recording medium in front of one or more read/write heads. The tape drives are usually streaming devices in which data is recorded in a serpentine fashion as the tape streams back and forth. In particular, the tape drive typically writes the data along a number of pin reception tracks that span the length of the medium. For this reason, data storage tape cartridges can be viewed as sequentially storing the data in a linear format.

The linear data storage format prevents true random access to individual files. Rather, a tape drive must scan through the entire length of the tape until the appropriate file mark is identified, thereby increasing the file retrieval time. Due to the lack of true random access to individual files stored within the data storage tape cartridges and the affinity for the pre-existing data storage tape cartridge library, a need exists for a data storage cartridge configured to house and protect a non-tape storage device and yet be compatible with conventional, automated, data storage tape cartridge library systems.

SUMMARY OF THE INVENTION

One aspect of the present invention relates to a data storage cartridge including a housing and a hard drive. The housing defines an access window and at least one alignment feature. The hard drive is maintained within the housing. The hard drive has at least one electrical connection point, and the at least one alignment feature is configured to interact with the hard drive to align the at least one electrical connection point relative to the access window.

Another aspect of the present invention relates to a method of assembling a hard drive to a housing of a data storage cartridge. The method includes providing a housing of a data storage cartridge defining an access window, placing the hard drive including at least one electrical connection point within the housing, and aligning the at least one electrical connection point relative to the access window in at least one of an X-direction and a Y-direction. The X-direction extends substantially parallel to a width of the access window. The Y-direction extends substantially parallel to a length of the access window. The step of aligning the at least one electrical connection point relative to the access window positions the at least one electrical connection point to be accessible from a position external to the data storage cartridge via the access window.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
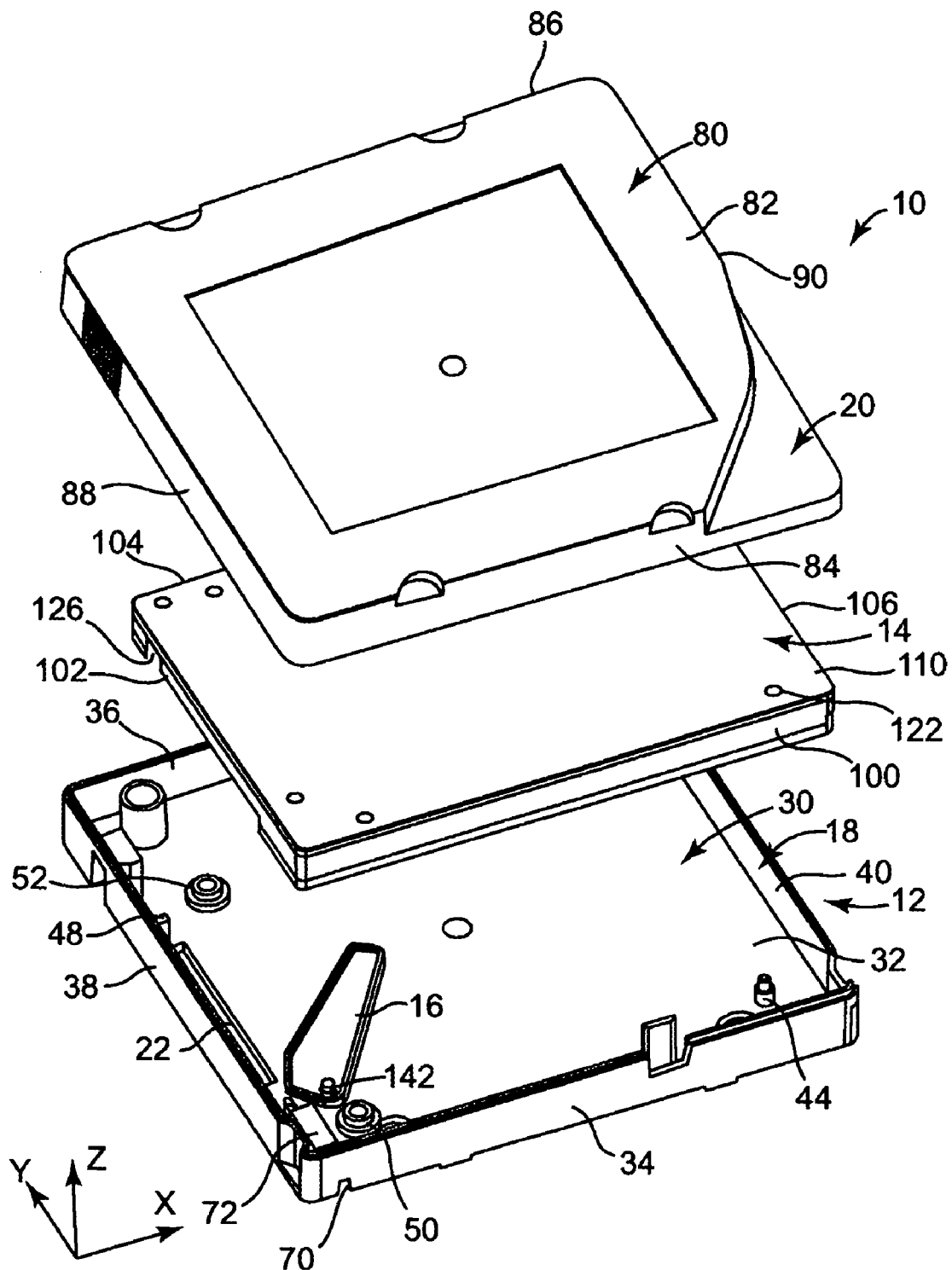
FIG. 1 is a perspective, exploded view of one embodiment of a data storage cartridge with an alignment feature in accordance with the present invention.

An exemplary data storage cartridge 10 according to one embodiment of the present invention is generally illustrated in FIG. 1. The data storage cartridge 10 includes a housing 12, a hard drive 14, and a door 16. The housing 12 includes a first housing section 18 and a second housing section 20 sized to collectively receive and substantially enclose the hard drive 14. In one preferred embodiment, the first housing section 18 serves as a base whereas the second housing section 20 serves as a cover. Remaining components of the data storage cartridge 10 are described in greater detail below. However, it should generally be understood that the first housing section 18 defines an access window 22 to provide access to the hard drive 14 from a point external to the data storage cartridge 10. In particular, a device external to the data storage cartridge 10 can access the hard drive 14 via the access window 22 to read from and write to the hard drive 14. The door 16 is coupled to the first housing section 18 to selectively open and close the access window 22, thereby selectively allowing access to the hard drive 14. It should be understood that the directional terminology such as "cover," "base," "first," "second," etc., are used for purposes of illustration only, and are in no way limiting.

Figure 2:
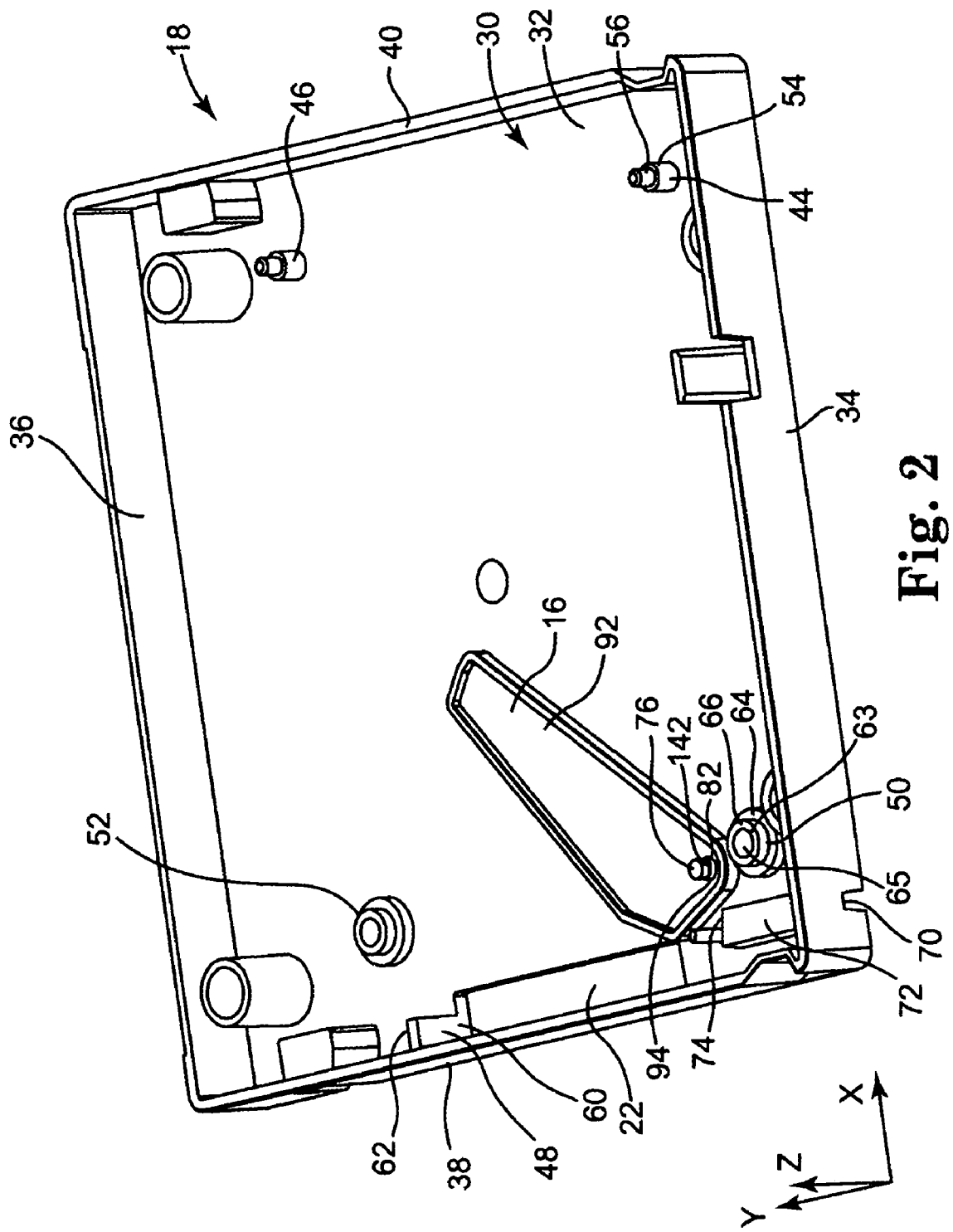
FIG. 2 is a perspective view of one embodiment of a first housing section of the data storage cartridge of FIG. 1.

In one embodiment, best illustrated in FIG. 2, the first housing section 18 has a major member 30, which is substantially planar and defines an interior surface 32 and an exterior surface 33 (FIG. 4) opposite the interior surface 32. The first housing section 18 also forms a leading wall 34, a trailing wall 36, a first side wall 38, and a second side wall 40, each of which extends in a generally perpendicular fashion from a different edge of the major member 30, more particularly, the interior surface 32. The major member 30 defines the access window 22 near the first side wall 38. The access window 22 is preferably elongated and runs parallel to the first side wall 38. As such, the access window 22 has a width in a direction parallel the leading edge 34 and a length parallel the first side edge 38.

The first housing section 18 further defines at least one alignment feature to facilitate placement of the hard drive 14 (FIG. 3) into the first housing section 18 such that the hard drive 14 is properly aligned with the access window 22. With this in mind, and in one embodiment, the first housing section 18 includes a first alignment post 44, a second alignment post 46, an alignment rib 48, a first attachment pillar 50, and a second attachment pillar 52. As described in greater detail below, one or more of the components 44–52 can serve as the alignment feature such that a plurality of alignment features are preferably provided. Alternatively, one or more of the components 44–52 can be eliminated and/or other alignment features added.

The first and second alignment posts 44 and 46 are preferably positioned relatively near the second side wall 40. The alignment post 44 extends from the interior surface 32 of the major member 30. Preferably, the alignment post 44 extends from the interior surface 32 in a two-tiered manner to form a first or bottom tier 54 and a second or top tier 56. The first tier 54 extends directly from the interior surface 32, whereas the second tier 56 extends from the first tier 54 opposite the interior surface 32. Both of the tiers 54 and 56 preferably have a substantially circular transverse cross-sectional shape, and the first tier 54 has a larger circular cross-section, and therefore a larger diameter, than the second tier 56. Alternatively, the first alignment post 44 can be a single tier extending from the interior surface 32 with a diameter similar to the diameter of the second tier 56 described above. The second alignment post 46 is spaced from the first alignment post 44 and is formed and extends from the interior surface 32 in a similar manner as the first alignment post 44.

The alignment rib 48 is a tab-like structure extending from the interior surface 32 and from the first side wall 38. Preferably, the alignment rib 48 extends from both the interior surface 32 and the first side wall 38 in a substantially perpendicular manner relative to respective planes defined by the interior surface 32 and the first side wall 38. As such, the alignment rib 48 extends from the interior surface 32 a distance defining a height of the alignment rib 48, and the alignment rib 48 extends from the first side wall 38 a distance defining a width of the alignment rib 48. The alignment rib 48 defines a first surface 60 facing the leading wall 34, a second surface 62 opposite the first surface 60 (i.e., facing the trailing wall 36), and a thickness or distance between the first surface 60 and the second surface 62. In one embodiment, the thickness of the alignment rib 48 is in the range of 0.068 inch to 0.072 inch.

The first attachment pillar 50 is positioned relatively near the first side wall 38 and the leading wall 34 of the first housing section 18 as compared to the second side wall 40 and the trailing wall 36. The first attachment pillar 50 extends from the interior surface 32 of the major member 30 to terminate in a leading end 63 opposite the interior surface 32. The first attachment pillar 50 is a substantially hollow structure and, therefore, forms a passage 65 from exterior surface 33 (FIG. 4) to the leading end 63. The first attachment pillar 50 is configured to facilitate attachment of the first housing section 18 to the hard drive 14 (FIG. 1) as described below.

In one preferred embodiment, the first attachment pillar 50 extends from the interior surface 32 to define an interface surface 63 opposite the interior surface 32. Preferably, the first attachment pillar 50 is substantially circular in transverse cross-section. The first attachment pillar 50 is substantially hollow and defines a passage 65 extending axially throughout the first attachment pillar 50 from the exterior surface 33 of the major member 30. In one embodiment, the first attachment pillar 50 extends from the interior surface 32 in a two-tiered manner forming a first tier 64 and a second tier 66. The first tier 64, which extends directly from the interior surface 32, has a diameter that is larger than a diameter of the second tier 66, which extends from the first tier 64 opposite the interior surface 32. Notably, the first and second tiers 64 and 66 are preferably co-axially aligned and collectively form the passage 65. In an alternative embodiment, the first attachment pillar 50 is formed as a single tier that independently forms the passage 65. The second attachment pillar 52 is positioned relatively near the trailing wall 36 and the first side wall 38. The second attachment pillar 52 is formed and extends from the interior surface 32 in a similar manner as described with respect to the first attachment pillar 50.

In addition to the alignment features 44–52 described above, in one embodiment, the first housing section 18 further forms a pin reception slot 70. More particularly, the major member 30 and the leading wall 34 collectively define the pin reception slot 70 longitudinally spaced from the access window 22 and laterally spaced from the first side wall 38. In particular, the pin reception slot 70 extends through the major member 30 to and through the leading wall 34. In one embodiment, the first housing section 18 further defines a pin reception track 72 which encloses a substantial portion of the pin reception slot 70. The pin reception track 72 generally has an inverted U-shape, the cavity formed by the inverted U-shape being aligned with and above a substantial portion of the pin reception slot 70.

The first housing section 18 further includes, in one embodiment, a pivot post 76 extending from the interior surface 32. Preferably, the pivot post 76 is positioned between the pin reception slot 70 and the second side wall 40 and is substantially nearer the first side wall 38 than the second side wall 40. The pivot post 76 is preferably cylindrical and adapted to rotatably receive the door 16 as will be further described below.

Preferably, the first housing section 18, including the various features described above, is formed of a polymeric material. More preferably, the first housing section 18 is formed by injection molding of a suitable material such as polycarbonate. Alternatively, other materials and/or manufacturing techniques can be employed to form the first housing section 18.

As illustrated in FIG. 1, the second housing section 20 of the housing 12 includes a major member 80 that is substantially planar and defines an exterior surface 82 and an interior surface (not shown) opposite the exterior surface 82. The second housing section 20 further defines a leading wall 84, a trailing wall 86, a first side wall 88, and a second side wall 90 each extending from the major member 80 opposite the exterior surface 82 about a perimeter of the major member 80. In particular, the trailing wall 86 is positioned opposite the leading wall 84, and the first and second side walls 88 and 90 extend between the leading wall 84 and trailing wall 86 opposite one another. The major member 80 is sized similar to the major member 30 of the first housing section 18. In addition, the walls 84, 86, 88, and 90 extend from the major member 80 in a similar manner as the walls 34, 36, 38, and 40 extend from the major member 30. Accordingly, each of the walls 84, 86, 88, and 90 of the second housing section 20 are configured to mate with the walls 34, 36, 38, and 40 of the first housing section 18, respectively, to couple the first housing section 18 to the second housing section 20. In one embodiment, the first and second housing sections 18 and 20 are configured to be coupled at least in part via a screw connection. Preferably, the second housing section 20 is formed of a polymeric material. More preferably, the second housing section 20 is formed by injection molding or a suitable material such as polycarbonate. Alternatively, other materials and/or manufacturing techniques can be employed to form the second housing section 20.

In one preferred embodiment, the housing 12 has a length (i.e., a dimension along a direction parallel to the leading walls 34 and 104) of approximately 4.15 inch (105.4 mm), a width of approximately 4.01 inch (102 mm), and a height of approximately 0.85 inch (21.5 mm), which is typical for a conventional data tape cartridge. In other embodiments, the external dimensions of the housing 12 conform to one of a number of industry-standard form factors, such as the form factors of the Black Watch™ 9840 and the Royal Guard™ 3480, 3490E, 3490EL, and 9490EE standard magnetic storage tape cartridges manufactured by Imation Corp. of Oakdale, Minn. In one embodiment, the length of the housing 12 is less than 6 inches and the width of the housing 12 is less than 5 inches.

In one embodiment, best illustrated in FIG. 2, the door 16 is provided apart from the first housing section 18 and includes a planar member 92 sized and shaped to cover or close the access window 22. Accordingly, the planar member 92 preferably has a width equal to or greater than the width of the access window 22 and a length equal to or greater than the length of the access window 22. The planar member 92 further defines a connection aperture 94 positioned substantially near at least one edge of the door 16. The connection aperture 94 is sized and shaped to fit snugly and rotatably around the pivot post 76 of the first housing section 18. In one preferred embodiment, the door 16 is formed of a polymeric material. In one preferred embodiment, the door 16 is formed by injection molding of a suitable material such as acetal. Alternatively, other materials and/or manufacturing techniques can be employed to form the door 16. Even further, a wide variety of other door configurations can be provided.

Figure 3:
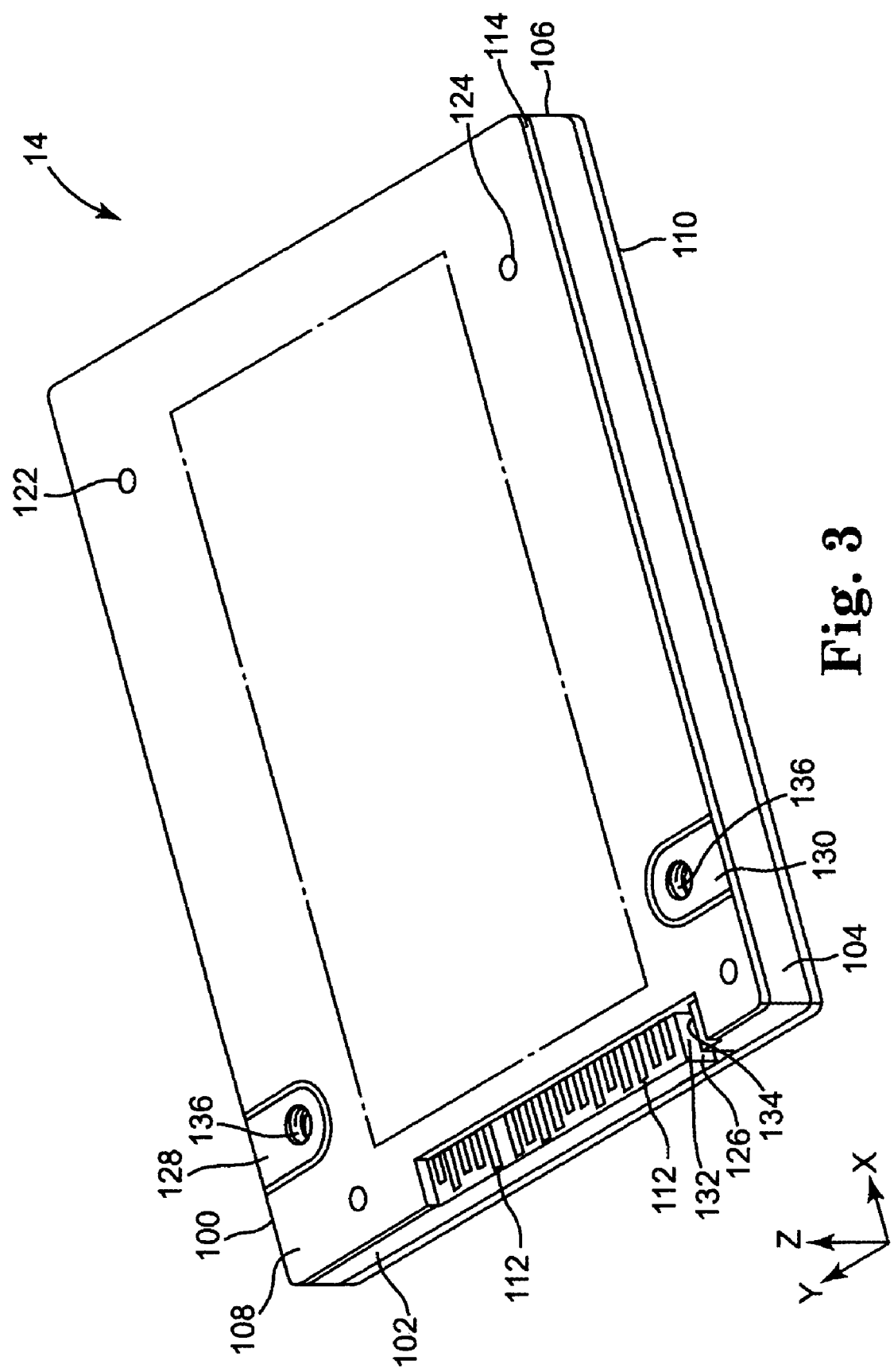
FIG. 3 is a bottom perspective view of one embodiment of a hard drive of the data storage cartridge of FIG. 1.

Referring to the bottom, perspective view of FIG. 3, the hard drive 14 or non-tape storage medium may take the form of a variety of storage media, such as a disc-shaped magnetic storage medium, a solid-state storage medium, an optical storage medium, a magneto-optical storage medium, and a holographic storage medium. The solid-state storage medium may be any non-volatile memory such as an erasable programmable read-only memory (EPROM), an electrically erasable programmable memory (FLASH memory), or the like.

Preferably, the hard drive 14 is generally rectangular in structure and sized and shaped to fit within the housing 12 (FIG. 1). The hard drive 14 defines a first edge 100, a second edge 102, a third edge 104, and a fourth edge 106, which extend from one another to define a rectangular perimeter of the hard drive 14. The hard drive 14 further defines opposing first and second major surfaces 108 and 110. The first surface 108 is at least partially defined by a printed circuit board 114. The hard drive 14 further includes at least one electrical connection or access point 112 positioned on or near the first surface 108 and near or adjacent the second edge 102 of the hard drive 14. The at least one electrical connection point 112 is adapted to be accessed by a tape drive emulator as described below. In a preferred embodiment, the hard drive 14 includes a plurality of electrical connection points 112 arranged as an elongated strip.

In order to facilitate aligning the at least one electrical connection point 112 of the hard drive 14 with the access window 22 (FIG. 1) formed in the first housing section 18 (FIG. 1), the hard drive 14 has at least one hard drive alignment feature to interact with the at least one housing alignment feature. In one embodiment, the hard drive 14 defines a first mounting cavity 122, a second mounting cavity 124, an alignment slot 126, a first attachment interface 128, and a second attachment interface 130. As described in greater detail below, one or more of the components 122–130 can serve as the hard drive alignment feature such that a plurality of hard drive alignment features are preferably provided. Alternatively, one or more of the components 122–130 can be eliminated and/or other hard drive alignment features added.

The first mounting cavity 122 is formed to receive the first alignment post 44 (FIG. 2) of the first housing section 18. In particular, the first mounting cavity 122 is defined from the first surface 108 at least partially towards the second surface 110. Preferably, the first mounting cavity 122 is substantially circular in transverse cross-section, having a diameter that is slightly larger than the diameter of the second tier 56 (FIG. 2) and slightly smaller than the diameter of the first tier 54 (FIG. 2) of the first alignment post 44.

In one embodiment, the first mounting cavity 122 is alternatively elongated or parabolic in transverse cross-section. The parabolically shaped first mounting cavity 122 is orientated such that a maximum diameter of the first mounting cavity 122 extends parallel to the edges 102 and 106. A minimum diameter of the parabolic first mounting cavity 122 is just slightly larger than a diameter of the first alignment post 44 (FIG. 1). The second mounting cavity 124 is formed in a substantially similar manner as the first mounting cavity 122, and as such is preferably substantially circular or parabolic in transverse cross-section. The second mounting cavity 124 is positioned relatively near the third edge 104 and the fourth edge 106 of the hard drive 14 in a position configured to receive the second alignment post 46.

The hard drive 14 further defines the alignment slot 126 along the second edge 102 of the hard drive 14. The alignment slot 126 is sized and positioned to receive the alignment rib 48 (FIG. 1) of the first housing section 18 (FIG. 1). In particular, the alignment slot 126 is defined by a first side wall 132 and a second side wall 134 opposite the first side wall 132. The first side wall 132 is positioned to interact with the first surface 60 (FIG. 1) of the alignment rib 48. Similarly, the second side wall 134 is configured to interact with the second surface 62 (FIG. 1) of the alignment rib 48. As such, the first side wall 132 and the second side wall 134 are spaced a distance slightly greater than a thickness of the alignment rib 48.

The first attachment interface 128 is formed at least in part in the first surface 108 of the hard drive 14. The properties of the first attachment interface 128 are dependent upon the attachment device 67 (FIG. 5) chosen to secure the hard drive 14 to the first housing section 18. In one embodiment, in which the attachment device 67 is a screw, the first attachment interface 128 defines a threaded cavity 136 configured to receive the screw. The first attachment interface 128 is positioned relatively near the first edge 100 and the second edge 102 of the hard drive 14. In particular, the first attachment interface 128 is positioned to align with the first attachment pillar 50 (FIG. 2) of the first housing section 18 (FIG. 2) upon final assembly. The second attachment interface 130 is formed by the hard drive 14 in a similar manner as described with respect to the first attachment interface 128. The second attachment interface 130 is positioned relatively near the second edge 102 and the third edge 104 of the hard drive 14. In particular, the second attachment interface 130 is positioned to be aligned with the second attachment pillar 52 (FIG. 2) of the first housing section 18. As such, the first and second attachment interfaces 128 and 130 are positioned relative to each other similar to how the first and second attachment pillars 50 and 52 are positioned relative to each other.

As illustrated in FIG. 2, the data storage cartridge 10 is assembled by first coupling the door 16 to the first housing section 18. In particular, the pivot post 76 of the first housing section 18 is rotatably received by the connection aperture 94 of the door 16. The door 16 is attached such that when in a closed position, the door 16 closes to fully cover the access window 22 and, when in an open position of FIG. 2, the door 16 uncovers the access window 22. In one embodiment, a torsion spring 142 is placed around the pivot post 76 and coupled with the door 16 to bias the door 16 to the closed position. Notably, the torsion spring 142 allows the door 16 to rotate about the pivot post 76 upon application of an external force. However, upon removal of the external force, the torsion spring 142 is adapted to return the door 16 to the closed position. Alternatively, other biasing devices can be employed and/or the torsion spring 142 can be eliminated.

Figure 4:
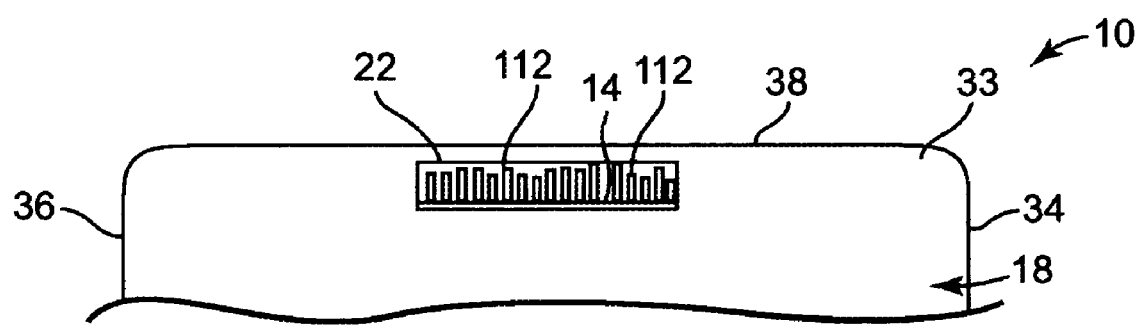
FIG. 4 is a partial bottom view of the data storage cartridge of FIG. 1.

Referring to FIG. 1, the hard drive 14 is placed at least partially within the first housing section 18 such that the second edge 102 of the hard drive 14 is substantially adjacent the first side wall 38 of the first housing section 18. The door 16 is positioned between the hard drive 14 and the interior surface 32 of the first housing section 18 (best shown in FIG. 5). Further, as shown in FIG. 4, the hard drive 14 is positioned within the first housing section 18 such that the at least one electrical connection point 112 aligns with the access window 22, it being understood that the door 16 (FIG. 1) is in the open position in FIG. 4 to better illustrate the electrical connection points 112. In particular, the one or more hard drive alignment features of the hard drive 14 are mated with the corresponding alignment features of the first housing section 18 to ensure proper alignment. In one embodiment, the alignment features of the hard drive 14 and the first housing section 18 align the hard drive 14 relative the first housing section 18 in at least on of an X-direction, a Y-direction, and a Z-direction. The X-direction is parallel to the leading and trailing walls 34 and 36 of the first housing section 18. The Y-direction is perpendicular to the X-direction and, as such, runs substantially parallel to the side walls 38 and 40 of the first housing section 18. The Z-direction is perpendicular to the plane defined by the X and Y-directions.

Figure 6:
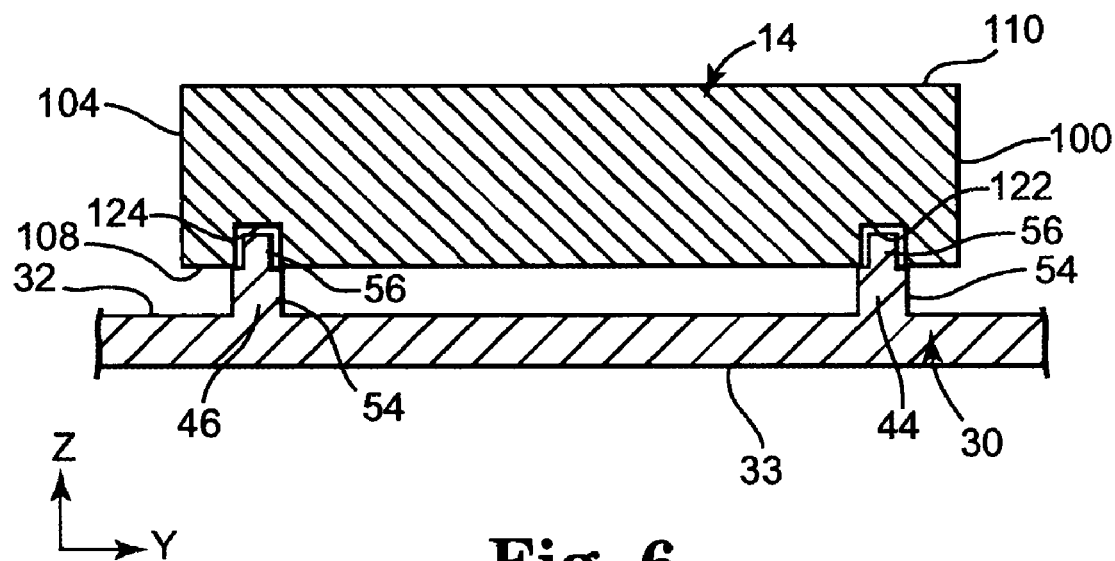
FIG. 6 is another cross-sectional view of one embodiment of the hard drive assembled to the first housing section of the data storage cartridge of FIG. 1.

With the above directional definitions in mind, in one preferred embodiment, illustrated in the cross-sectional view of FIG. 6, the hard drive 14 is positioned such that a portion of each of the alignment posts 44 and 46 of the first housing section 18 are received within the first and second mounting cavities 122 and 124, respectively, of the hard drive 14. More precisely, the first mounting cavity 122 receives the second or top tier 56 of the first alignment post 44. In one embodiment, the first alignment post 44 and the first mounting cavity 122 are sized such that the first surface 108 of the hard drive 14 surrounding the first mounting cavity 122 rests on the first or bottom tier 54 of the first alignment post 44. As such, the first tier 54 maintains the Z-direction spacing of the first surface 108 of the hard drive 14 relative to the interior surface 32 of the first housing section 18. The second alignment post 46 interacts with the second mounting cavity 124 in a similar manner as described with respect to the first alignment post 44 and the first mounting cavity 122.

The interaction between the second tiers 56 and the mounting cavities 122 and 124 position the hard drive 14 with the first housing section 18 providing preliminary alignment in the Y-direction and more precise alignment in the X-direction (FIG. 1). Alternatively, the interaction between the second tiers 56 and the cavities 122 and 124 can precisely align the hard drive 14 within the first housing section 18 in both the X and Y-directions, whereas the precision of the alignment is dependent upon the difference in size of the mounting cavities 122 and 124 relative the alignment posts 44 and 46 in each of the X and Y-directions. Preferably, the alignment posts 44 and 46 interact with the mounting cavities 122 and 124 to align the hard drive 14 in the X-direction with respect to the first housing section 18 within +/−0.01 inch, more preferably within +/−0.005 inch, of the desired alignment.

Figure 5:
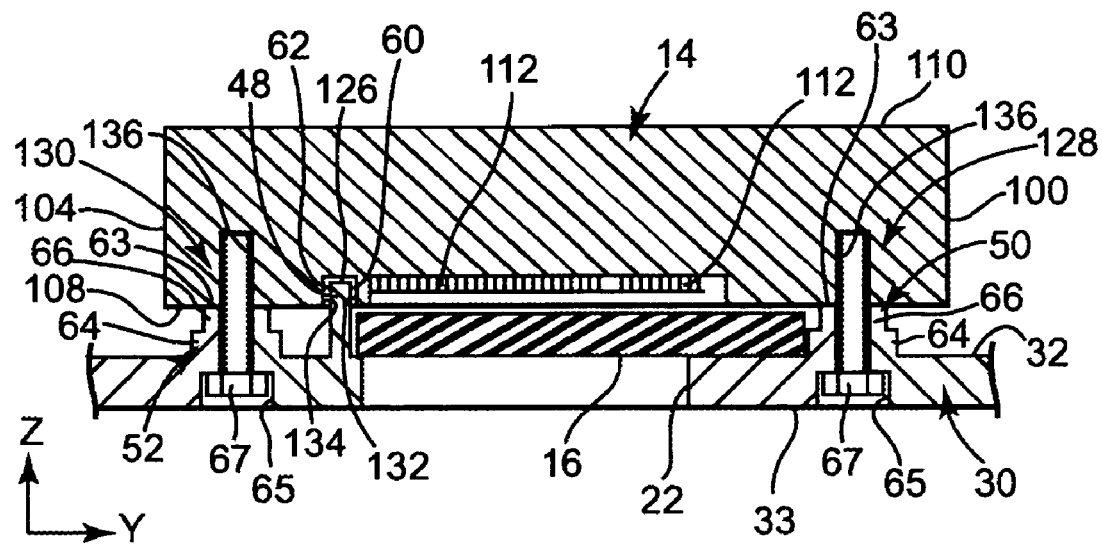
FIG. 5 is a cross-sectional view of one embodiment of the hard drive assembled to the first housing section of the data storage cartridge of FIG. 1.

In a preferred embodiment, best illustrated in FIG. 5, the hard drive 14 is placed within the first housing section 18 so the alignment slot 126 of the hard drive 14 receives the alignment rib 48 of the first housing section 18. In particular, the first surface 60 of the alignment rib 48 is positioned adjacent the first side wall 132 of the alignment slot 126. Similarly, the second surface 62 of the alignment rib 48 is positioned adjacent the second side wall 134 of the alignment slot 126. The alignment slot 126 and the alignment rib 48 interact to align the hard drive 14 with respect to the first housing section 18 primarily in the Y-direction. The alignment of the hard drive 14 relative the first housing section 18 in the Y-direction is preferably more precise than the preliminary alignment in the Y-direction provided by the alignment posts 44 and 46 and the mounting cavities 122 and 124. Preferably, the alignment rib 48 interacts with the alignment slot 126 to align the hard drive 14 in the Y-direction with respect to the first housing section 18 within +/−0.01 inch, more preferably within +/−0.005 inch, of the desired alignment.

Once the hard drive 14 is properly aligned in the X and Y-directions, attachment devices 67, such as screws, are run from the exterior surface 33 of the first housing section 18 through the passages 65 of the attachment pillars 50 and 52 and into the hard drive 14, namely the attachment interfaces 128 and 130, to secure the hard drive 14 to the first housing section 18. More particularly, in one embodiment, the screws 67 are run through the attachment pillars 50 and 52 and into the threaded cavities 136. The attachment pillars 50 and 52 extend from the interior surface 32 such that the interface surfaces 63 of the attachment pillars 50 and 52 interact with the first surface 108 of the hard drive 14, thereby maintaining the first surface 108 of the hard drive 14 spaced from the interior surface 32 of the first housing section 18 and providing clearance for the door 16. In one embodiment, the passages 65 of the attachment pillars 50 and 52 are formed to allow the screws 67 to be counter-sunk in the first housing section 18. Other or additional methods of attachment between the first housing section 18 and the hard drive 14 will be apparent to those of ordinary skill in the art. Preferably, the attachment pillars 50 and 52 interact with the attachment interfaces 128 and 130 via an attachment device to align the hard drive 14 in the Z-direction with respect to the first housing section 18 within +/−0.006 inch, more preferably within +/−0.003 inch, of the desired alignment.

Once the hard drive 14 is secured to the first housing section 18, the second housing section 20 is placed over the hard drive 14 to interact with the first housing section 18 as best illustrated in FIG. 1. In particular, the leading wall 84, the trailing wall 86, the first side wall 88, and the second side wall 90 of the second housing section 20 interact with the leading wall 34, the trailing wall 36, the first side wall 38, and the second side wall 40 of the first housing section 18, respectively. In one preferred embodiment, the first housing section 18 is coupled to the second housing section 20 via a screw connection. Other devices or method of securing the second housing section 20 to the first housing section 18 will be apparent to those of ordinary skill in the art. In one embodiment, the second housing section 20 is further coupled with the hard drive 14. As described above, the door 16 remains in the closed position covering the access window 22 due to the bias force of the torsion spring 142 unless exposed to an external force. Therefore, during storage of the data storage cartridge 10, the door 16 remains in the closed position to prevent or impede dust or other contaminants from entering the data storage cartridge 10.

Figure 7:
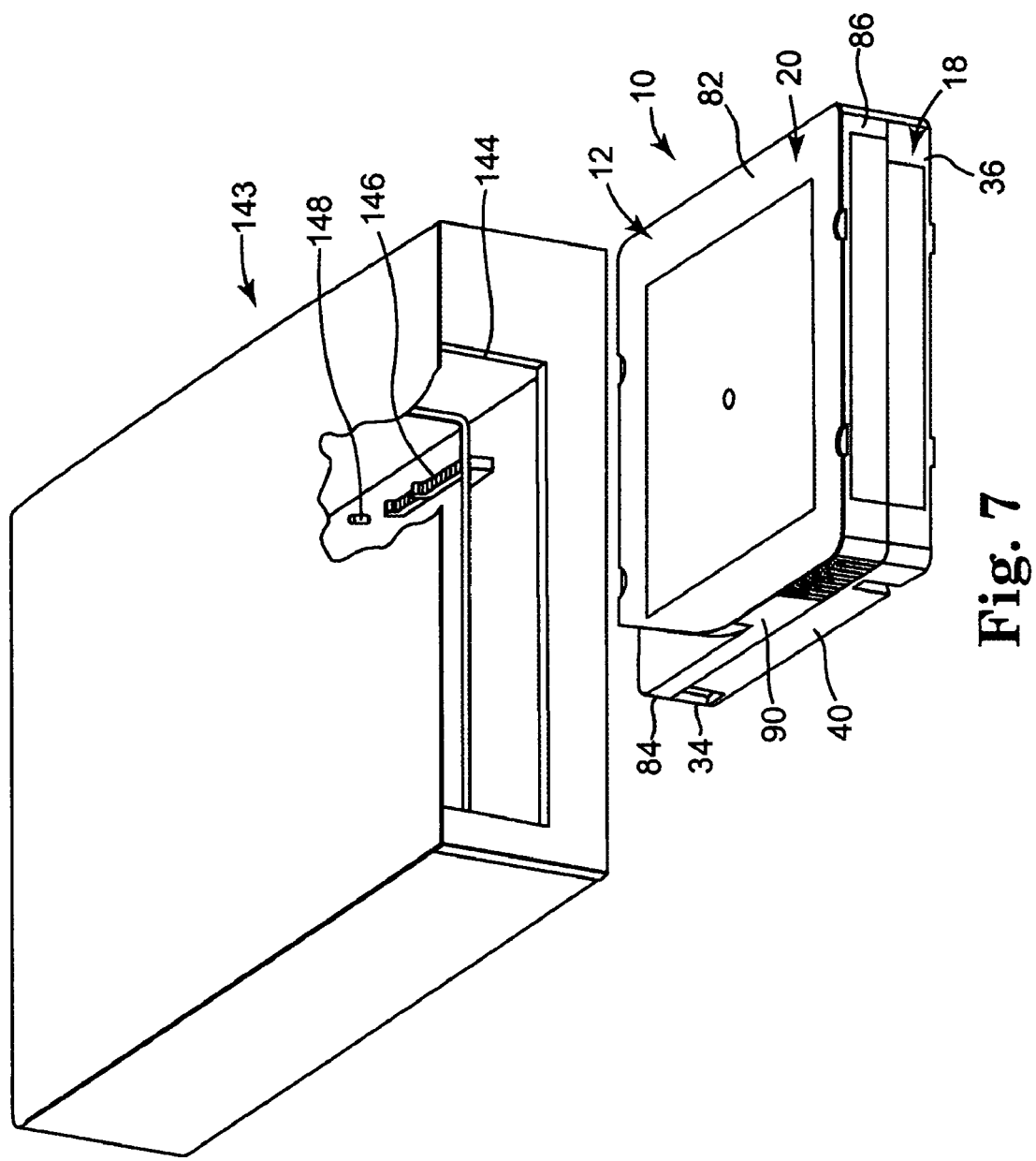
FIG. 7 is a perspective view of one embodiment of a tape drive emulator and the data storage cartridge of FIG. 1.

Similar to the interaction between the conventional data storage tape cartridges and tape drives, the data storage cartridge 10 is adapted to interact with the tape drive emulator 143 as illustrated in FIG. 7. The tape drive emulator 143 is adapted to access the hard drive 14 (FIG. 1 and FIG. 5) within the housing 12 in order to read or write data to and from the hard drive 14. In one embodiment, the tape drive emulator 143 is further adapted to convert the data received from the hard drive 14 into a format emulating or imitating the typical data format retrieved from conventional, data storage tape cartridges as fully described in U.S. patent application Ser. No. 10/294,514 filed Nov. 14, 2002 entitled "Method and System for Emulating Tape Storage Format Using a Non-Tape Storage Medium," which is hereby incorporated herein by reference. In this manner, the tape drive emulator 143 appears to other computing devices as a conventional data storage tape cartridge. Therefore, the drivers or software executing on the other computing devices need not be altered to interact with the tape drive emulator 143 rather than with a conventional tape drive with which the drivers and software were originally designed to interact. As such, replacement of a conventional tape drive with the tape drive emulator 143 allows an existing system or library to utilize data storage cartridges 10 including a hard drive 14 rather than the conventional, data storage tape cartridges.

Referencing FIG. 5 and FIG. 7, one embodiment of the tape drive emulator 143 includes a socket 144, an emulator connector 146, and an actuator pin 148 in order to access the hard drive 14 of the data storage cartridge 10. The socket 144 is adapted to selectively receive the data storage cartridge 10 and contains the emulator connector 146 and the actuator pin 148. The emulator connector 146 is adapted to interact with the at least one electrical connection point 112 of the hard drive 14. The actuator pin 148 is adapted to interact with the door 16, placing an external force upon the door 16 to open the door 16 and uncover the access window 22.

Figure 8:
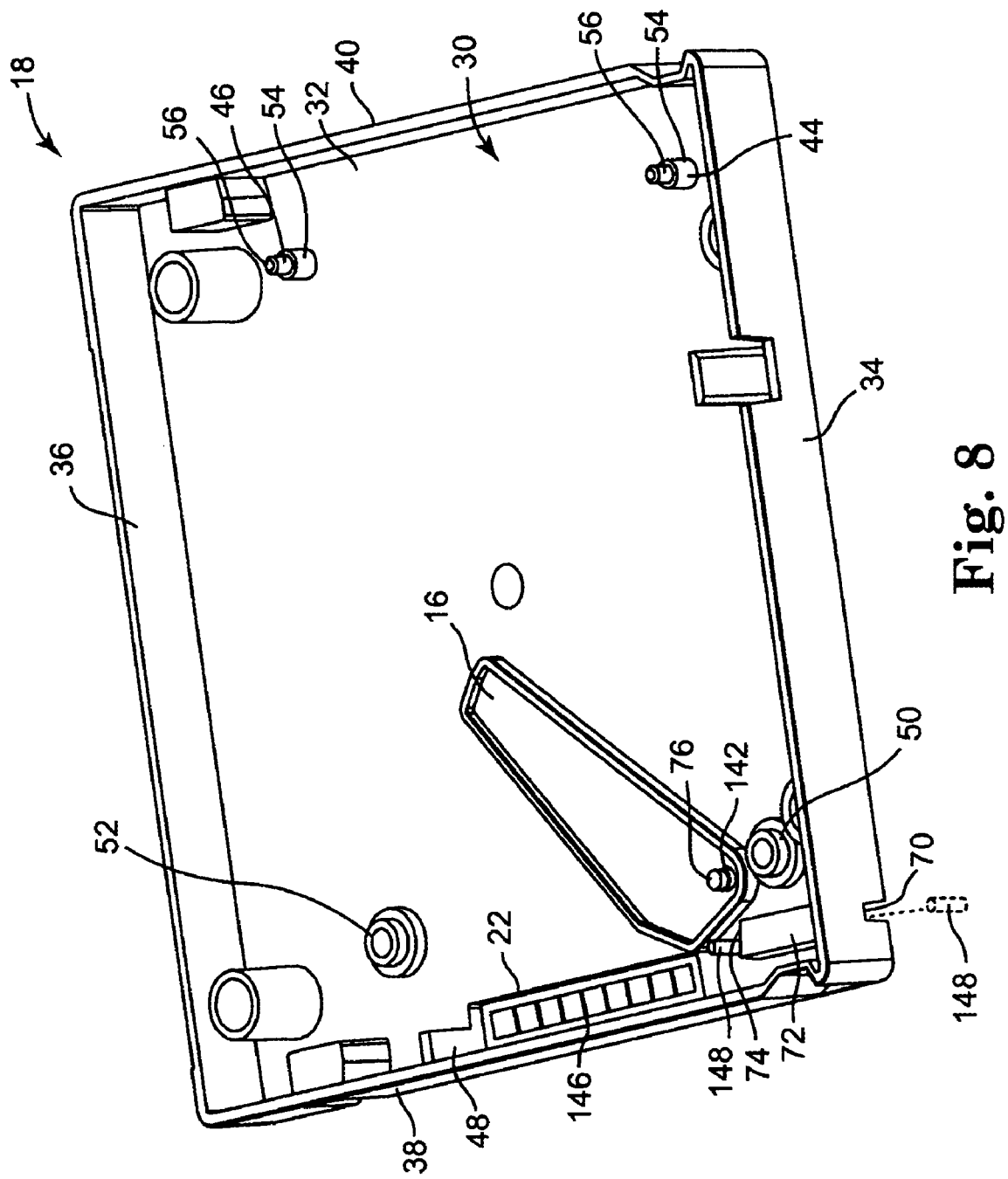
FIG. 8 is a perspective view of one embodiment of the first housing section of the data storage cartridge of FIG. 1 with the door in the open position and portions of the tape drive emulator of FIG. 7.

In particular, referring to FIG. 7 and FIG. 8 (that otherwise illustrates an interior of the data storage cartridge 10 without the hard drive 14 for ease of explanation), during use, the data storage cartridge 10 is positioned with the leading walls 34 and 84 facing the tape drive emulator 143, and the data storage cartridge 10 is slid into the socket 144. As the data storage cartridge 10 is slid into the socket 144, the actuator pin 148 is aligned with the pin reception slot 70 of the first housing section 18 of the data storage cartridge 10 as illustrated in FIG. 8 with hidden lines. Notably, FIG. 8 illustrates the first housing section 18 and the door 16 with the second housing section 20 (FIG. 1) and the hard drive 14 (FIG. 5) removed for clarity as well as a position of the emulator connector 146 and the actuator pin 148 relative to the cartridge 10 upon final insertion. As the data storage cartridge 10 is slid further within the socket 144, the actuator pin 148 is slid along the pin reception slot 70 and through the pin reception track 72. Eventually, the actuator pin 148 interacts with the door 16 applying an external force to the door 16.

Further sliding of the data storage cartridge 10 into the socket 144 results in the actuator pin 148 applying additional external force to the door 16 overcoming the bias of the torsion spring 142, thereby loading the torsion spring 142 (and any additional torsion spring(s) or other biasing components not shown), and causing the door 16 to rotate about the pivot post 76 of the first housing section 18. Once the data storage cartridge 10 is placed as far into the tape drive emulator 143 as allowed, the actuator pin 148 has rotated the door 16 to a fully open position, as illustrated in FIG. 8. When in the open position, the door 16 leaves the access window 22 uncovered and substantially unobstructed.

When the door 16 is in the open position of FIG. 8, the emulator connector 146 is aligned with the access window 22. As such, the emulator 143 can access the at least one electrical connection point 112 (FIG. 5) of the hard drive 14 (FIG. 5) through the access window 22 since the at least one electrical connection point 112 is properly aligned with the first housing section 18. The tape drive emulator 143 sends or retrieves data from the hard drive 14 to a master computer via the at least one electrical connection point 112 and the emulator connector 146. Upon removal of the data storage cartridge 10 from the tape drive emulator 143, the data storage cartridge 10 is slid in the opposite direction, and the actuator pin 148 slides back towards the leading edges 34 and 84 of the data storage cartridge 10, removing the external force on the door 16 and exiting the pin reception slot 70. Removal of the external force applied by the actuator pin 148 allows the door 16 to return to its closed position due to the bias or unloading force of the torsion spring 142 (and/or other biasing components). Therefore, when in the storage or closed position, the data storage cartridge 10 is closed decreasing the amount of dust or other contaminates entering the housing 12 that can damage the hard drive 14.

Figure 9:
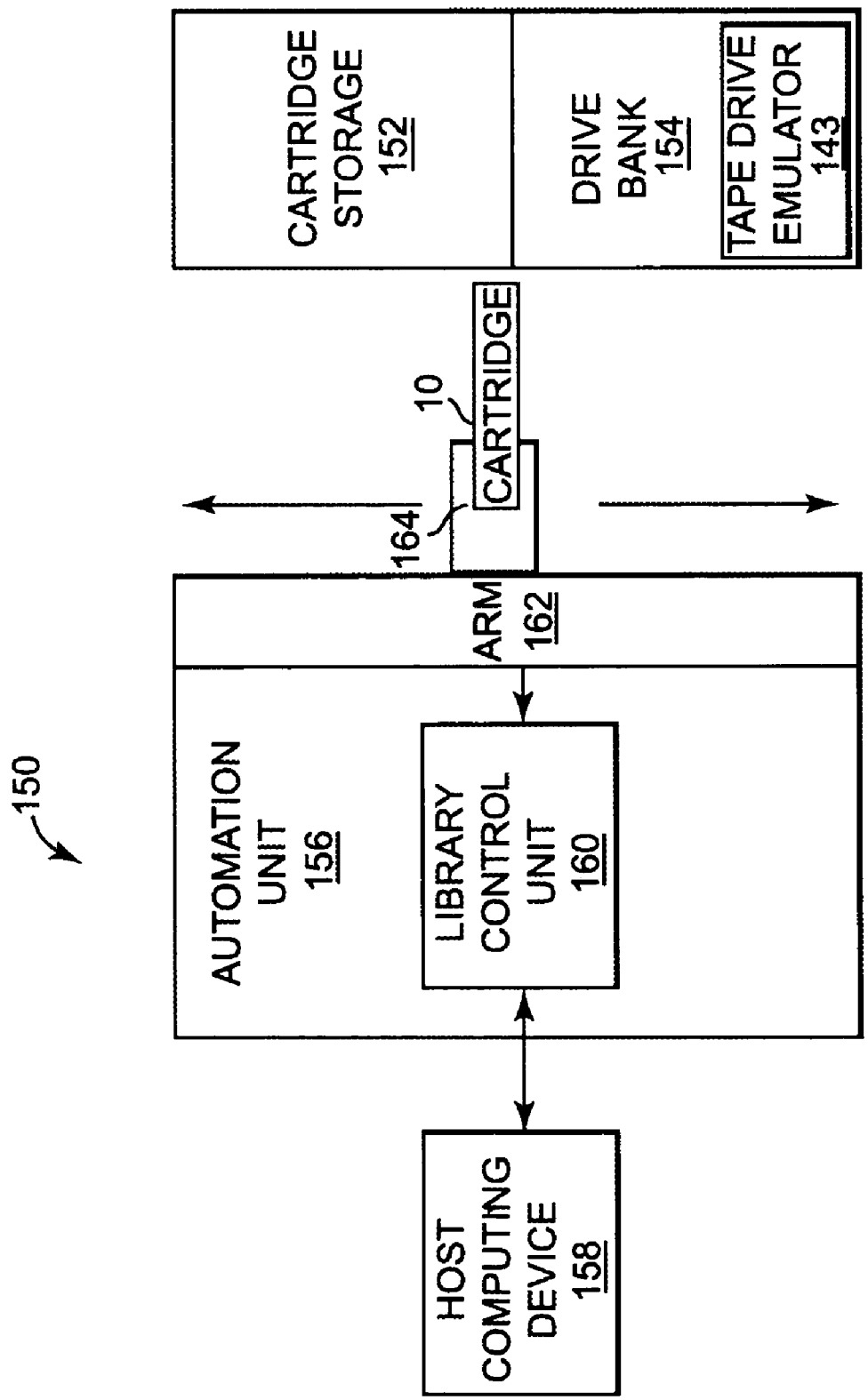
FIG. 9 is a block diagram of one embodiment of a library system incorporating the data storage cartridge of FIG. 1.

Notably, since the data storage cartridge 10, or more particularly, the housing 12, takes on the form factors of traditional, data storage tape cartridges, the data storage cartridge 10 is adapted to be used with traditional library systems. One embodiment of an automated library system 150 incorporating at least one data storage cartridge 10 is generally illustrated in FIG. 9. The automated library system 150 includes a cartridge storage 152, a drive bank 154, an automation unit 156, and a host computing device 158. Generally, the host computing device 158 signals the automation unit 156 to retrieve a particular data storage tape cartridge 10. The automation unit 156 removes the particular data storage tape cartridge 10 from the cartridge storage 152 and inserts the particular data storage tape cartridge 10 into the tape drive emulator 143 in the drive bank 154. When in the tape drive emulator 143, the host computing device 158 accesses the particular data storage cartridge 10 to read from or write to the data storage cartridge 10. Upon reading and/or writing to the data storage cartridge 10, the host computing device 158 signals the automation unit 156, and the automation unit 156 returns the particular data storage tape cartridge 10 to the cartridge storage 152.

The cartridge storage 152 provides a plurality of storage cartridge locations (not shown) for storage. Each storage location, also referred to as a cell, provides storage for a single data storage cartridge 10, and each data storage cartridge 10 has an assigned storage location within the cartridge storage 152. In addition, each of the data storage cartridges 10 stored in the cartridge storage 152 can include identifying information, such as a label, a bar code, or a radio frequency (RF) tag, by which the automation unit 156 identifies the individual data storage cartridges 10. Due to use of the automation unit 156 in the automated library system 150, the cartridge storage 152 is created with precise dimensions, as required by the automation unit 156, to allow the automation unit 156 to easily access a particular storage location within the cartridge storage 152. In one embodiment, the cartridge storage 152 includes a plurality of conventional, data storage tape cartridges as well as a plurality of data storage cartridges 10.

The drive bank 154 includes at least one, and preferably a plurality of, drive locations (not shown). Each of the drive locations is adapted to receive a conventional tape drive or a tape drive emulator 143. The drive bank 154 is also constructed with precise measurements, as required by the automation unit 156, to allow the automation unit 156 to easily access a particular tape drive or tape drive emulator 143 within a particular drive location. Each of the tape drives or tape drive emulators 143 is connected to the host computing device 158 such that the host computing device 158 can access a data storage tape cartridge or a data storage cartridge 10 via the tape drive or the tape drive emulator 143, respectively. In one embodiment, the drive bank 154 only includes the tape drive emulators 143. In another embodiment, the drive bank 154 includes at least one conventional tape drive and at least one tape drive emulator 143.

The automation unit 156 facilitates movement of the data storage cartridges 10 between the cartridge storage 152 and the drive bank 154. The automation unit 156 includes a library control unit 160 and a robotic arm 162. The library control unit 160 is configured to receive instruction and direction from the host computing device 158 and to generate signals to activate the automation unit 156 in accordance with the instructions received. In particular, the library control unit 160 interprets storage access requests from the host computing device 158, and provides signals to control the motion and operation of the robotic arm 162. The robotic arm 162 typically includes a gripper 164 to facilitate secure handling of the data storage cartridges 10. The host computing device 158 is any computer system configured to relay access signals from a user (not shown) to the automation unit 156 and to read and write to the data storage cartridges via the tape drive emulator 143 contained within the drive bank 154.

During use, in response to communication signals from the host computing device 158, the library control unit 160 generates control signals directing the robotic arm 162 to retrieve the appropriate data storage cartridge 10 from the cartridge storage 152 and to insert the data storage cartridge 10 into one of the tape drive emulators 143 in the drive bank 154. In response to the signals from the library control unit 160, the robotic arm 162 traverses the cartridge storage 152 and engages the cartridge 10 using the gripper 164. The robotic arm 162 then moves the cartridge 10 to the drive bank 154 to insert the cartridge 10 into one of the tape drive emulators 143. Upon insertion of the data storage cartridge 10 into one of the tape drive emulators 143, the host computing device 158 can write data to and read data from the data storage cartridge 10. In one embodiment, the automated library system 150 similarly works to access conventional, data storage tape cartridges via conventional tape drive contained with the drive bank 154. Notably, the data storage cartridge 10 can similarly be used with individual or stand-alone tape drive emulators 143 rather than in the library context.

Because the data storage cartridges 10 conform to standard form factors or dimensions of the conventional data storage tape cartridges, the conventional data storage tape cartridge and the data storage cartridge 10 are mechanically indistinguishable by the automation unit 156. In this matter, the mechanical interfaces between the automation unit 156 need not be adapted or upgraded to support the substitution of the data storage cartridges 10 for the typical data storage tape cartridges.

In particular, existing robotic arms adapted to grasp and interact with typical data storage tape cartridges will be able to grasp and interact with the data storage cartridge according to the present invention since the two cartridges have similar external dimensions. Therefore, traditional and existing cartridge libraries that replace the traditional tape drives with tape drive emulators will be able to utilize the data storage cartridges and, in particular, will be able to utilize the efficiencies of hard drive storage over traditional linear tape storage. In other words, use of hard drives will allow the libraries to support true random access to individual files stored within the hard drives, thereby decreasing file retrieval time. Further, since the hard drive is precisely aligned with the first housing section, the tape drive emulators can precisely and repetitively interact with the at least one electrical connection point of the hard drive through the access window of the first housing section. This precise interaction provides for a more reliable reading of or writing to the data storage tape cartridge.

Although specific embodiments have been illustrated and described herein, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate the present invention may be implemented in a very wide variety of embodiments. This application is intended to cover any adaptations or variations of the embodiments discussed herein. Therefore, it is manifestly intended that this invention be limited only by the claims and the equivalence thereof For example, although described as including alignment posts, an alignment rib, and attachment pillars, the alignment features of the first housing section may take on one of a variety of configurations provided each alignment feature is configured to facilitate alignment of the hard drive within the first housing section at least partially in at least one of the X, Y, and Z-directions. Similarly, the hard drive alignment feature, although described as a mounting cavity, an alignment slot, and an attachment interface, can take on one of a variety of configurations adapted to interact with the first housing section alignment feature to at least partially align the hard drive within the first housing section at least partially in at least one of the X, Y, and Z-directions.

What is claimed is:

1. A data storage cartridge comprising:
   a housing including polymeric material and a first major and planar member that defines at least three sides of an access window, the housing defining an interior cavity and at least one alignment feature positioned within the interior cavity; and
   a hard drive maintained within the interior cavity, the hard drive having at least one electrical connection point;
   wherein the at least one alignment feature of the housing is configured to interact with the hard drive to align the at least one electrical connection point relative to the access window in a Z-direction that is perpendicular to the first major and planar member, and the at least one alignment feature of the housing includes an attachment pillar configured to align the at least one electrical connection point relative to the access window in the Z-direction; and
   further wherein the attachment pillar defines a passage axially extending through the attachment pillar, and the data storage cartridge further comprises:
   an attachment device inserted through the passage and into the housing to facilitate alignment of the at least one electrical connection point relative to the access window in the Z-direction.

2. The data storage cartridge of claim 1, wherein the at least one alignment feature further includes at least one alignment post configured to align the at least one electrical connection point relative to the access window in the X-direction and an alignment rib configured to align the at least one electrical connection point relative to the access window in the Y-direction, and further wherein the attachment pillar and the alignment post each have a different geometry than the alignment rib.

3. The data storage cartridge of claim 1, wherein the at least one alignment feature additionally includes an alignment post configured to facilitate alignment of the at least one electrical connection point of the hard drive with the access window defined by the housing, the alignment post defining a first tier having a first diameter and extending from the first major and planar member of the housing and a second tier having a second diameter and extending from the first tier opposite the first major and planar member of the housing, the first diameter being greater than the second diameter.

4. The data storage cartridge of claim 3, wherein the hard drive includes a mounting cavity configured to at least partially receive the alignment post.

5. The data storage cartridge of claim 1, wherein the at least one alignment feature additionally includes an alignment rib extending from the first major and planar member to define a substantially planar surface that extends in a direction substantially perpendicular to the access window.

6. The data storage cartridge of claim 5, wherein the alignment rib is positioned adjacent the access window.

* * * * *